(12) United States Patent
Fitzgerald et al.

(10) Patent No.: US 7,699,065 B2
(45) Date of Patent: Apr. 20, 2010

(54) METHOD AND APPARATUS FOR FILLING CONCRETE BIN

(75) Inventors: Roy F. Fitzgerald, Clearwater, FL (US); Charles B. Kleinmetz, St. Petersburg, FL (US)

(73) Assignee: Ecocrete, Inc., Tampa, FL (US)

( * ) Notice: Subject to any disclaimer, the term of this patent is extended or adjusted under 35 U.S.C. 154(b) by 794 days.

(21) Appl. No.: 11/466,246

(22) Filed: Aug. 22, 2006

(65) Prior Publication Data

US 2008/0060716 A1    Mar. 13, 2008

(51) Int. Cl.
    *B08B 3/04* (2006.01)
(52) U.S. Cl. .................................. 134/117; 134/166 R
(58) Field of Classification Search .............. 134/104.2, 134/117, 133, 134
    See application file for complete search history.

(56) References Cited

U.S. PATENT DOCUMENTS

| | | | | | |
|---|---|---|---|---|---|
| 1,492,675 | A | * | 5/1924 | Clark et al. | 414/303 |
| 2,758,726 | A | * | 8/1956 | Butler | 414/21 |
| 3,291,329 | A | * | 12/1966 | Ord | 414/420 |
| 4,096,959 | A | * | 6/1978 | Schaffler | 414/408 |
| 4,289,068 | A | * | 9/1981 | Heinrich | 100/215 |
| 4,464,987 | A | * | 8/1984 | Heinrich | 100/215 |
| 5,127,740 | A | * | 7/1992 | DeBoer | 366/2 |
| 5,221,173 | A | * | 6/1993 | Barnes | 414/346 |
| 5,685,978 | A | * | 11/1997 | Petrick et al. | 210/241 |
| 5,695,280 | A | * | 12/1997 | Baker et al. | 366/17 |
| 5,741,065 | A | * | 4/1998 | Bell et al. | 366/54 |
| 6,077,020 | A | * | 6/2000 | Neufeldt et al. | 414/399 |
| 6,206,477 | B1 | * | 3/2001 | Rexus et al. | 298/23 MD |
| 6,802,964 | B2 | * | 10/2004 | Preisser et al. | 210/172.1 |
| 6,817,677 | B1 | * | 11/2004 | Beiler | 298/22 C |
| 7,018,155 | B1 | * | 3/2006 | Heberling et al. | 414/408 |
| 7,118,633 | B2 | * | 10/2006 | Jenkins | 134/10 |

FOREIGN PATENT DOCUMENTS

| | | | |
|---|---|---|---|
| DE | 43 36 029 | * | 6/1994 |
| FR | 2 667 012 | * | 3/1992 |
| GB | 2249975 | * | 5/1992 |

OTHER PUBLICATIONS

European Patent Office 0 561 217 Sep. 1993.*

* cited by examiner

*Primary Examiner*—Frankie L Stinson
(74) *Attorney, Agent, or Firm*—Ronald E. Smith; Smith & Hopen, P.A.

(57) ABSTRACT

A concrete wash-out bin includes a primary receptacle having a rim positioned at an elevation that exceeds the elevation of a discharge port of certain items of concrete-handling equipment. An auxiliary receptacle is positioned in leading relation to the primary receptacle and is hingedly mounted to the primary receptacle. The auxiliary receptacle has a position of repose where it is horizontally disposed at an elevation lower than the discharge port of the concrete-handling equipment and a discharge position where it is disposed in elevated and angled relation to the position of repose. The discharge position is effective to discharge the contents of the auxiliary receptacle into the primary receptacle. The auxiliary receptacle is repeatedly lifted and lowered as needed until the concrete-handling equipment is free of residual concrete or until the primary bin is full.

11 Claims, 5 Drawing Sheets

METHOD AND APPARATUS FOR FILLING CONCRETE BIN

BACKGROUND OF THE INVENTION

1. Field of the Invention

This invention relates to the disposal of concrete and wash water that is produced when various items of concrete-handling equipment are cleaned. More particularly, it relates to a method and apparatus that enables such concrete-handling equipment to discharge concrete washout residue into a bin without requiring the equipment to be lifted to the level of the rim of the bin.

2. Description of the Prior Art

It is imperative that residual concrete be washed from concrete-handling equipment at the end of each work day. Failure to do so results in a gradual build-up of hardened concrete in the equipment. Such build-up may reduce the amount of usable concrete that can be delivered to a job site and it may increases the taxable weight of "empty" trucks or other equipment subject to taxation by weight. Studies have also shown that even small amounts of hardened concrete in equipment act as seeds that serve to accelerate the rate of build-up. If the problem is ignored, the amount of hardened concrete becomes substantial and the removal thereof is very problematic.

However, it is unacceptable from an environmental standpoint to simply wash out the inside of a ready-mixed concrete truck drum, a concrete boom pump truck, a hopper that receives concrete from a concrete boom pump truck, or other concrete-handling equipment with a water hose, so that the residual concrete is washed onto the ground. The wash water contains caustic soda and potash and therefore is classified by the Water Quality Act (part 116) as a hazardous substance. Accordingly, the Environmental Protection Agency requires the owners and operators of concrete-handling equipment to handle and dispose of the wash water as a hazardous substance, to maintain records of such wash water disposal for three (3) years, and to submit the records to the EPA when required.

Most companies that handle concrete comply with the requirements by collecting the wash water in a bin or receptacle and by transporting the filled bin or receptacle to a treatment facility such as a settling pond or the like. A typical bin has a rim that is about twenty to twenty four inches (20-24") above the ground or other support surface upon which it rests. Unfortunately, such elevation is too high for some concrete-handling equipment to reach. For example, the hopper that receives concrete from a boom pump has a funnel-like discharge downspout that is below the level of a typical washout bin. Such hoppers are too heavy to economically lift to a level where they can be positioned over a bin. Thus, owners of such hoppers and other such concrete-handling equipment are presented with a problem when told they must discharge all washout water into a bin that is higher than such equipment was designed to discharge into.

One solution to this problem is to provide a ramp that extends from the ground surface up to a level that is sufficiently elevated to enable a concrete-handling truck to back up the ramp and deploy its discharge chute above the rim. Published U.S. patent application No. US2004/0155126 discloses this solution to the problem.

However, the provision of a ramp may not be the optimal solution to the problem. Many concrete-handling trucks weigh about thirty-five (35) tons and are most stable when all wheels are on the ground. Backing such a heavy truck up a ramp is a risky maneuver and probably violates one or more OSHA safety regulations. If a wheel slides off a ramp, the results can be catastrophic, totaling the truck and placing the life of the driver in jeopardy. At least one such incident has already been reported since the advent of the EPA requirements and the introduction of ramps that enable compliance.

There is a need for an apparatus and method that enables the concrete-handling industry to comply with EPA requirements without ramps or other devices that cause heavy trucks to leave the ground.

However, in view of the art considered as a whole at the time the present invention was made, it was not obvious to those of ordinary skill in this art how the identified need could be fulfilled.

SUMMARY OF INVENTION

The long-standing but heretofore unfulfilled need for an apparatus and method that enables concrete washout residue to be delivered by low-elevation discharging equipment into a high-elevation bin is now met by a new, useful, and nonobvious invention. The novel structure is a concrete wash-out bin that includes a primary receptacle having a rim positioned at an elevation that exceeds the elevation of the discharge point or port of many concrete-handling items of equipment such as the hoppers used with concrete boom pump trucks. The primary receptacle has a depth sufficient to hold economically feasible quantities of concrete and water the novel structure further includes an auxiliary receptacle which may be hingedly mounted to the primary receptacle and has a position of repose where it is substantially horizontally disposed at an elevation lower than the discharge port of such concrete-handling equipment.

The auxiliary receptacle has a discharge position where it is disposed in elevated and angled relation to the position of repose. The discharge position is effective to discharge the contents of the auxiliary receptacle into the primary receptacle. Lifting and lowering means are provided for raising the auxiliary receptacle to the discharge position and for lowering the auxiliary receptacle to the position of repose, respectively.

Wash water and concrete residue from a hopper or other item of concrete-handling equipment is discharged into the auxiliary receptacle when the auxiliary receptacle is in its position of repose and the wash water and concrete residue is transferred to the primary receptacle by lifting the auxiliary receptacle from said position of repose to the elevated position. The auxiliary receptacle is lowered to the position of repose after being lifted to the discharge position so that additional wash water and concrete residue may be discharged into the auxiliary receptacle. The lifting and lowering operation is performed as many time as is needed until the wash water and concrete residue is removed from the item of concrete-handling equipment or until the primary receptacle is full, whichever first occurs.

The primary receptacle has an imperforate bottom wall, a transversely disposed front wall, a transversely disposed back wall, a first sidewall interconnecting a first end of the front wall to a first end of the back wall, and a second sidewall interconnecting a second end of the front wall to a second end of the back wall.

The auxiliary receptacle has an imperforate bottom wall, a transversely disposed front wall, a transversely disposed back wall, a first sidewall interconnecting a first end of said front wall to a first end of said back wall, and a second sidewall interconnecting a second end of the front wall to a second end of the back wall.

A first embodiment of the invention includes a platform for supporting the primary receptacle and the auxiliary receptacle. The platform is ground-supported and has a low profile so that the primary receptacle and the auxiliary receptacle are supported by the platform in closely spaced relation to said ground.

The first and second sidewalls of the primary receptacle have a common height and the front wall has a height less than the common height. A first mounting lug is secured to a top edge of the primary receptacle front wall, adjacent the first sidewall of the primary receptacle. A second mounting lug is secured to a top edge of the primary receptacle front wall, adjacent the second sidewall of the primary receptacle.

A first hinge plate has a trailing end rotatably mounted to the first mounting lug and a second hinge plate has a trailing end rotatably mounted to the second mounting lug. The first hinge plate has a leading end fixedly secured to the first sidewall of the auxiliary receptacle and the second hinge plate has a leading end fixedly secured to the second sidewall of the auxiliary receptacle.

A first pivot pin extends from the first hinge plate in normal relation thereto and a second pivot pin extends from the second hinge plate in normal relation thereto.

The lifting and lowering means includes a first lifting and lowering means having a first end secured to the platform and a second end pivotally secured to the first pivot pin and further includes a second lifting and lowering means having a first end secured to the platform and a second end pivotally secured to the second pivot pin. The first lifting and lowering means also includes a first plunger or rod telescopically engaged with a first cylinder, and the second lifting and lowering means includes a second plunger or rod telescopically engaged with a second cylinder. Extension of the first plunger with respect to the first cylinder effects rotation of the first hinge plate in a first direction about the first mounting lug and extension of the second plunger with respect to the second cylinder effects rotation of the second hinge plate in a first direction about the second mounting lug. Rotation of the first and second hinge plates about the first and second mounting lugs in the first direction, respectively, effects rotation of the auxiliary receptacle in a first direction relative to the primary receptacle. Retraction of the first plunger with respect to the first cylinder effects rotation of the first hinge plate in a second direction about the first mounting lug, said second direction being opposite to the first direction. Retraction of the second plunger with respect to the second cylinder effects rotation of the second hinge plate in the second direction about the second mounting lug, said second direction being opposite to the first direction. Rotation of the first and second hinge plates about the first and second mounting lugs in said second direction, respectively, effects rotation of the auxiliary receptacle in a second direction relative to the primary receptacle.

The first lifting and lowering means is preferably provided in the form of a first hydraulic cylinder and the second lifting and lowering means is preferably provided in the form of a second hydraulic cylinder.

The platform is adapted to be engaged by a chain so that a concrete-handling truck equipped with a winch may pull the platform and hence the primary receptacle and auxiliary receptacle towards the truck so that the truck need not be driven into close relationship with the platform.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
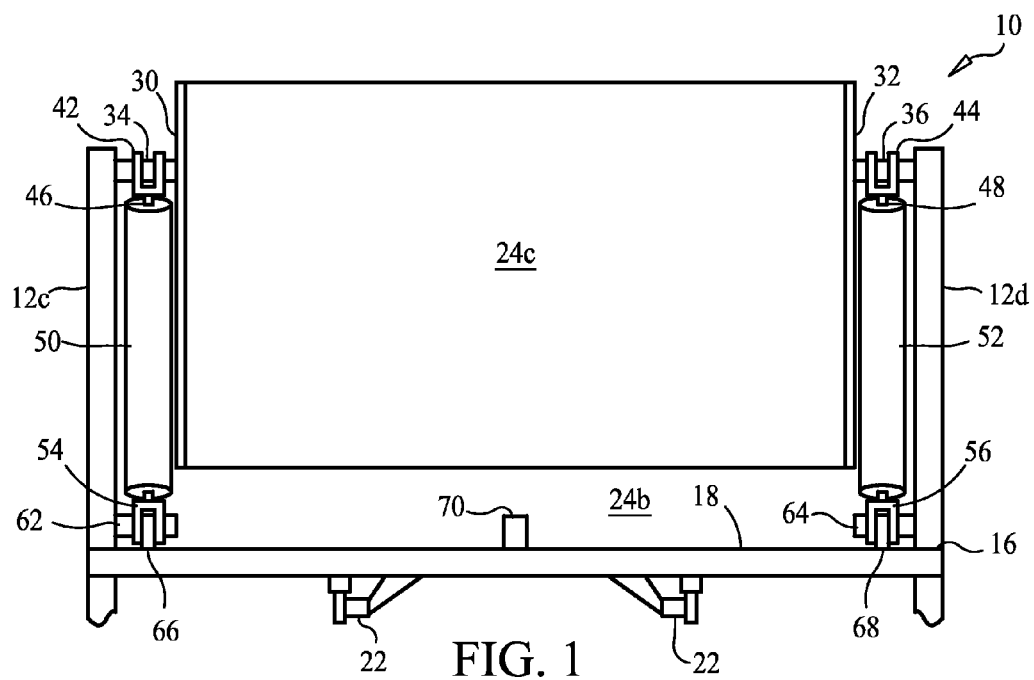
FIG. 1 is a front elevational view of a first embodiment of the novel structure in a position of repose.
Figure 2:
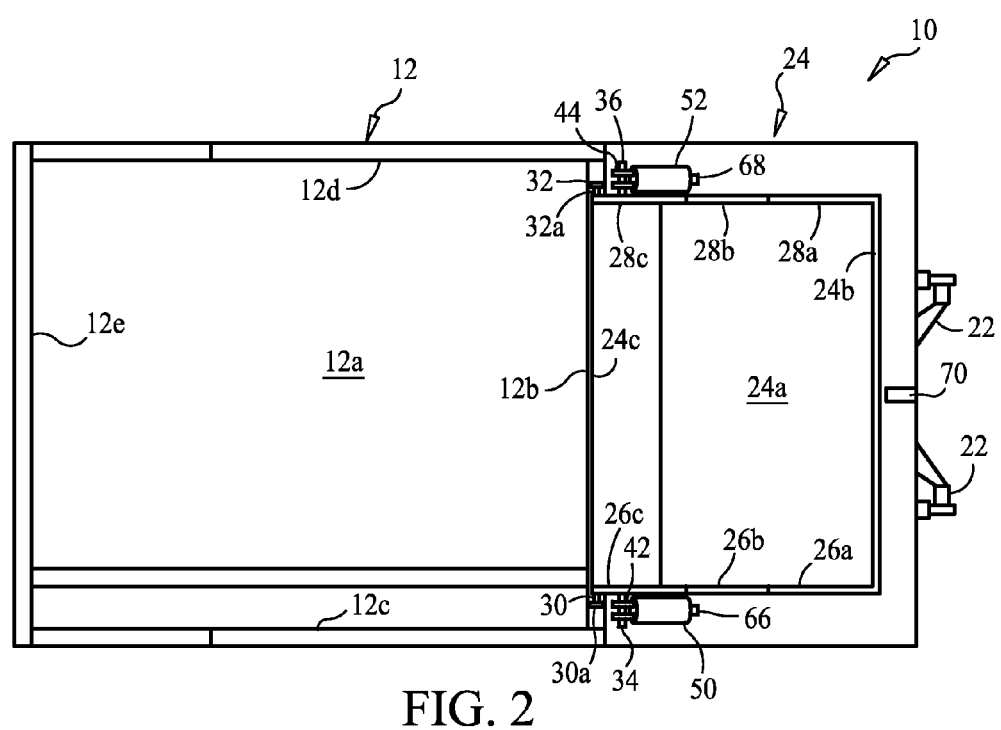
FIG. 2 is a top plan view thereof.
Figure 3:
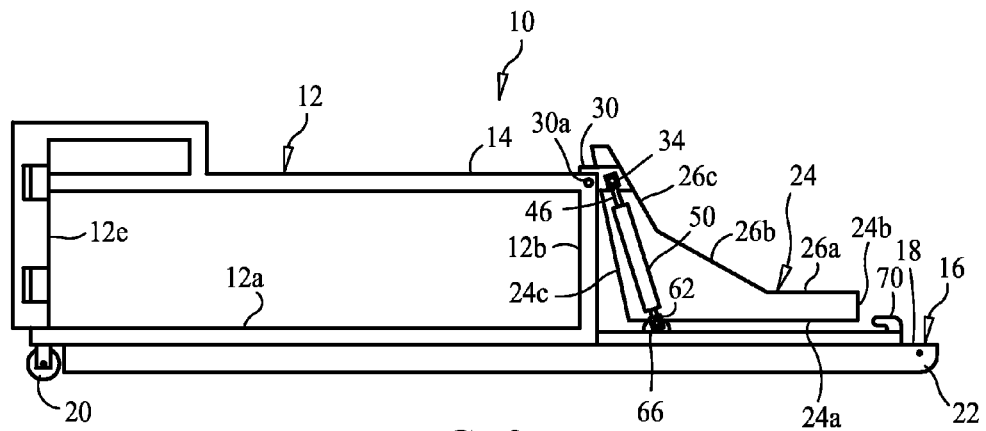
FIG. 3 is a side elevational view thereof.

Turning now to FIGS. 1-3, it will there be seen that an illustrative embodiment of the invention is denoted as a whole by the reference numeral 10.

Concrete wash-out bin 12 is the primary receptacle for receiving wash out water. Its rim, denoted 14, is positioned at an elevation that exceeds the discharge point of certain concrete-handling equipment, not depicted, when such equipment is supported by the ground or other non-elevated road surface.

Primary receptacle 12 includes imperforate bottom wall 12a, transversely disposed front wall 12b, longitudinally disposed sidewalls 12c, 12d, and transversely disposed back wall 12e. In a preferred embodiment, the height of front wall 12b is less then the height of sidewalls 12b, 12c.

The inventive structure includes a low platform 16 having a flat support surface 18 upon which primary receptacle 12 rests. Platform 16 is supported at a trailing end by a first pair of caster wheels denoted 20 and at a leading end by a second pair of caster wheels denoted 22. Other types of wheels are within the scope of this invention.

Auxiliary bin or receptacle 24 is positioned atop platform 16 in leading, adjacent relation to primary receptacle 12. It includes flat, imperforate bottom wall 24a, transversely disposed front wall 24b, and transversely disposed back wall 24c. Forward sidewalls 26a, 28a determine the depth of auxiliary receptacle 24. Medial sidewalls 26b, 28b interconnect said forward sidewalls to rear sidewalls 26c, 28c, respectively.

Hinge plates 30, 32 are pivotally mounted at their respective trailing ends as at 30a, 32a in surmounting relation to front wall 12b of primary receptacle 12. More particularly, a first mounting lug, not depicted, is mounted to front wall 12b adjacent sidewall 12c and a second mounting lug, not depicted, is mounted to the front wall adjacent sidewall 12d. The height of each mounting lug is roughly equal to the difference in height between front wall 12b and sidewalls 12c, 12d.

The respective leading ends of said hinge plates are fixedly secured to rear sidewalls 26c, 28c of auxiliary receptacle 24, near the respective upper ends thereof as best depicted in FIG. 3.

Upper axle members 34, 36 are welded to their associated hinge plates 30, 32 and extend therefrom in normal relation thereto, i.e., in a horizontal plane. Upper clevis members 42, 44 receive upper axle members 34, 36, respectively, and are mounted to the free ends of plungers 46, 48, respectively, of hydraulic cylinders 50, 52.

Lower clevis members 54, 56 are mounted to the respective lower ends of said hydraulic cylinders 50, 52. Lower clevis member 54 engages lower axle 62 and lower clevis member 56 engages lower axle 64. Mounting members 66, 68 engage said lower axles 62, 64, respectively, and are secured to support surface 18 of platform 16.

Auxiliary receptacle 24 is in its position of repose in FIGS. 1-3. It is only a few inches above ground level. A chain, not depicted, attached to a winch, not depicted, that is mounted to a concrete-handling truck, not depicted, at or near the trailing end of said truck, is engaged to chain hook 70 that is mounted to the leading end of platform 16. The winch is activated to wind the chain about a reel, not depicted, thereby pulling platform 16 towards the trailing end of the truck. Thus it is understood that the driver of the truck need not back the truck up all the way to said platform 16, but merely needs to be sufficiently close to enable the chain to engage chain hook 70 so that the winch can pull the platform to the truck.

Figure 4:
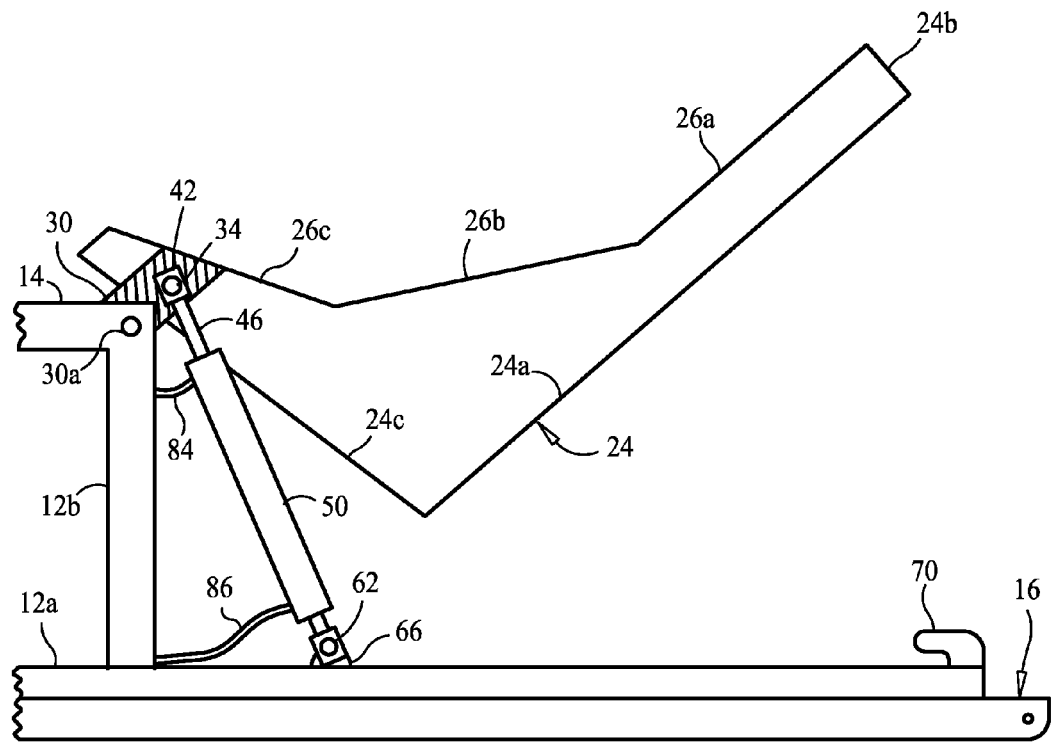
FIG. 4 is a side elevational view when the auxiliary receptacle is lifted about fifty percent (50%) of its total lift.
Figure 5:
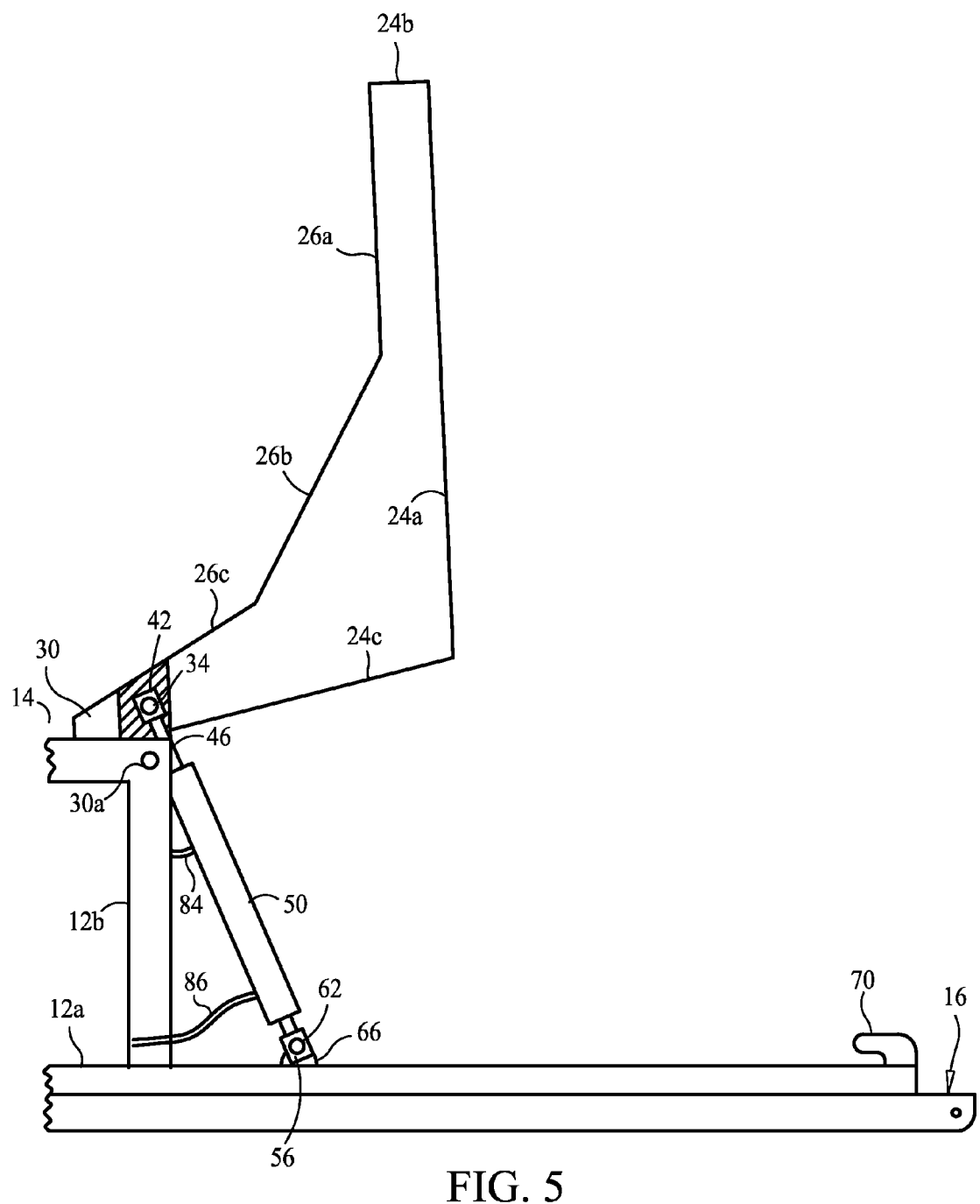
FIG. 5 is a side elevational view when the auxiliary receptacle is lifted about one hundred percent (100%) of its total lift.

FIG. 4 depicts the position of auxiliary receptacle 24 when plungers 46, 48 are about fifty percent (50%) extended and FIG. 5 depicts the position of said auxiliary receptacle when said plungers are fully extended. The water and washed-out concrete from inside the concrete-handling equipment drain from said auxiliary receptacle 24 into primary receptacle 12 when said auxiliary receptacle is in said FIG. 5 position. After said auxiliary receptacle is emptied, plungers 46, 48 are retracted and auxiliary receptacle 24 returns to its FIG. 3 position of repose.

The above-described procedure is repeated until primary receptacle 12 is filled. The entire assembly including primary receptacle 12, auxiliary receptacle 14, and platform 16 are then loaded onto a flatbed truck or other suitable vehicle and transported over public highways to a facility equipped to empty primary receptacle 12 in an environmentally acceptable way so that apparatus 10 may be returned to service.

Although hydraulic cylinders are depicted, pneumatic, electrical, or manual means may also be used to perform the work of lifting auxiliary receptacle 24 from its FIG. 3 position of repose to its FIG. 5 position and returning it from said FIG. 5 position back to said FIG. 3 position.

Figure 6:
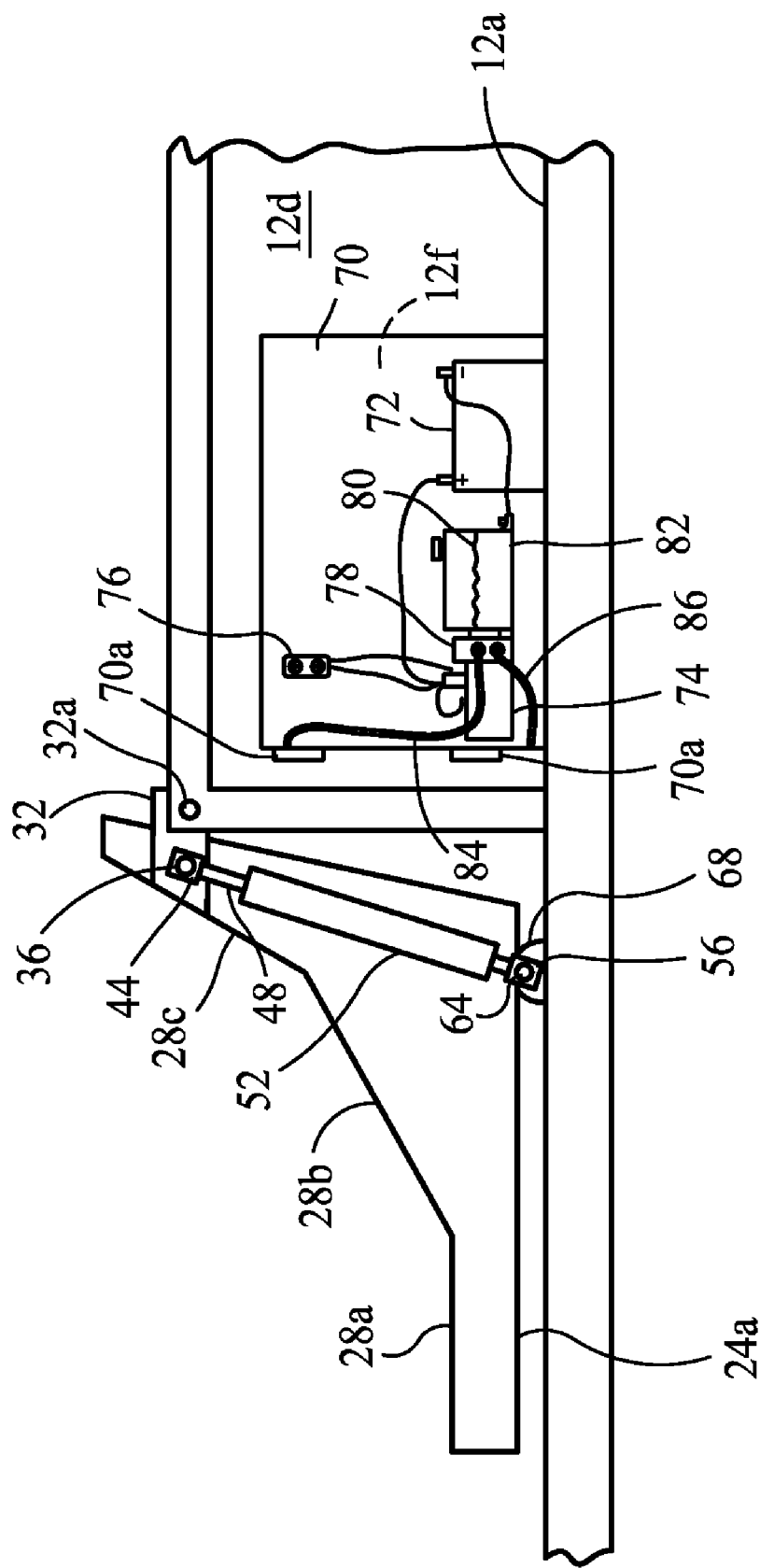
FIG. 6 is a side elevational view of the auxiliary receptacle when an access door is open.

In the embodiment of FIG. 6, sidewall 12d of primary receptacle 12 has a part 12f that is coplanar with sidewall 12d at its top edge but which is inclined so that its bottom edge protrudes about a foot into the open-topped cavity defined by primary receptacle 12. Triangular sidewalls, not depicted, are secured to each end of inclined sidewall 12f so that a closed compartment is formed. Locking door 70 is coplanar with sidewall 12d and is hinged as at 70a, 70a at a leading end and a lock, not depicted, is provided at its trailing end. The compartment created by the inclination of wall 12f is therefore closed when locking door 70 is open and is accessible when said locking door is open.

Twelve volt battery 72 is positioned in the compartment and is in electrical communication with hydraulic motor 74 through switch 76. Hydraulic pump 78 is connected in driven relation to hydraulic motor 74 and pressurizes hydraulic fluid 80 in hydraulic fluid reservoir 82. Hoses 84 and 86 provide fluid communication between pump 78 and opposite ends of hydraulic cylinders 50, 52. Hoses 84, 86 are preferably three thousands pounds per square inch hoses (3,000 psi), and hydraulic cylinders 50, 52 are preferably one inch bore, twelve inch stroke. The hydraulic cylinders are inclined rearwardly as depicted to provide a mechanical advantage when lifting auxiliary receptacle 24.

Figure 7:
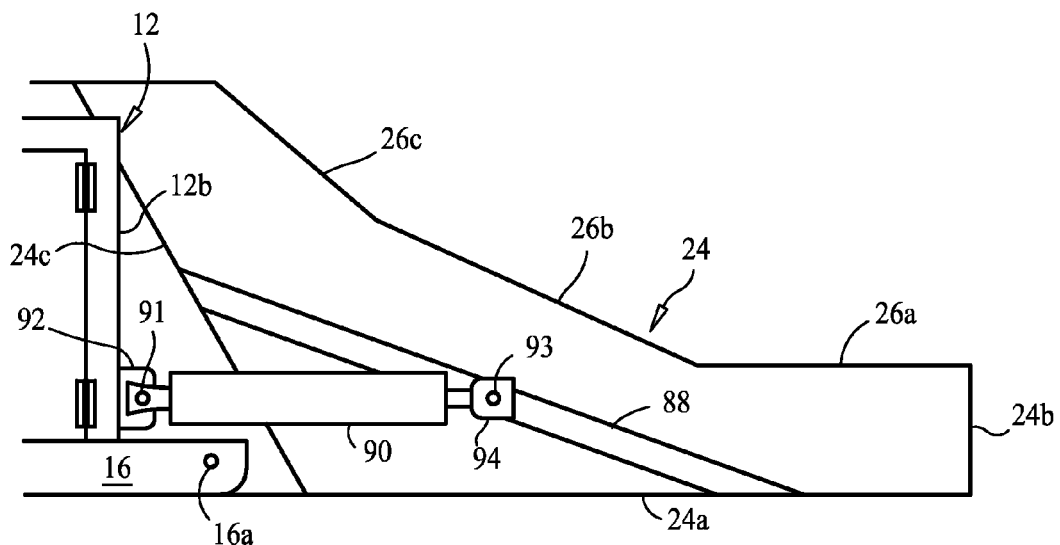
FIG. 7 is a side elevational view of a second embodiment when the auxiliary receptacle is in its lowered position.
Figure 8:
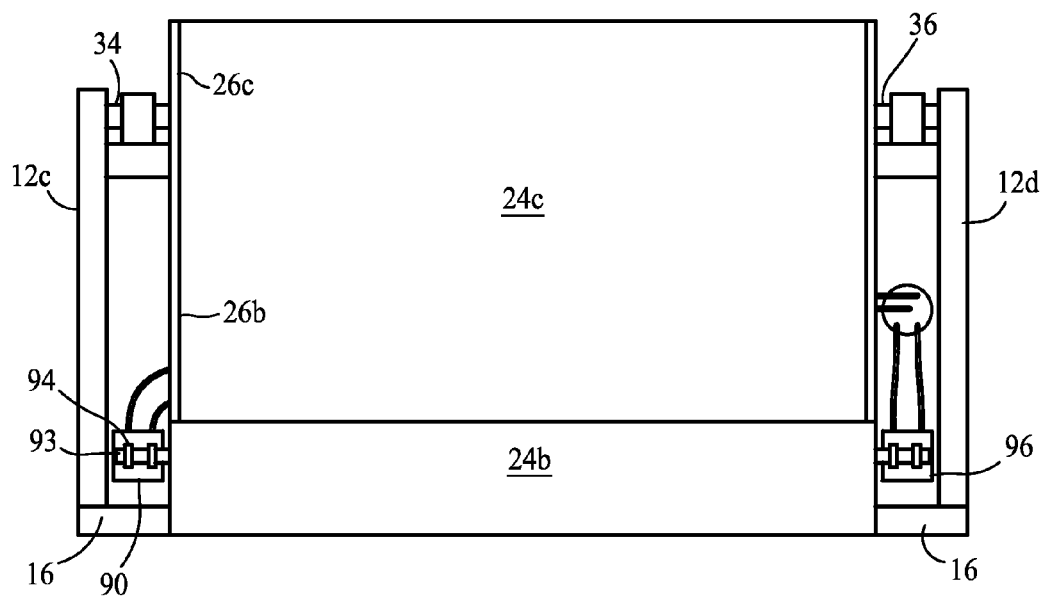
FIG. 8 is a front elevational view of the second embodiment.

A second embodiment, depicted in FIGS. 7 and 8, positions the rim of auxiliary receptacle 24 even lower than the first embodiment so that a discharge port as low as eight inches (8") from a road surface can still use the inventive structure. This lowering of auxiliary receptacle 24 is achieved by eliminating that part of platform 16 that underlies auxiliary receptacle 24 in the first embodiment. As depicted in FIG. 7, the leading end of platform 16 ends at 16a, in trailing relation to trailing wall 24c of auxiliary receptacle 24. This enables bottom wall 24a of auxiliary receptacle 24 to rest on the ground or a paved surface. In this embodiment, forward wall 24b of auxiliary receptacle 24 is only eight inches (8") in height. Auxiliary receptacles having even less depth are within the scope of this invention.

The second embodiment also discloses a different mounting position for the two (2) hydraulic cylinders that lift and lower auxiliary receptacle 24. A first rigid, preferably metallic channel member 88 is mounted to a first side of auxiliary receptacle 24 as depicted in FIG. 7 and its unillustrated counterpart is mounted in the same way to a second side of the auxiliary receptacle. Each channel member 88 has a leading end flush with bottom wall 24a of auxiliary receptacle 24 and a trailing end secured to trailing wall 24c of said auxiliary receptacle, about mid-height thereof.

A first hydraulic cylinder 90 has a trailing end pivotally mounted to axle 91 of clevis 92 and a leading end pivotally mounted to axle 93 of clevis 94. Clevis 92 is secured to forward wall 12b of primary receptacle 12 and clevis 94 is secured to channel 88 about mid-length thereof. Second hydraulic cylinder 96 is mounted in the same way to the opposite side of the novel apparatus, as depicted in FIG. 8. In this embodiment, hydraulic cylinders 90 and 96 are preferably three and one-half inch (3½") bore and twenty four inch (24") stroke but hydraulic cylinders of differing sizes, as well as other means for lifting auxiliary receptacle 24 with respect to primary receptacle 12, are within the scope of this invention.

It is important to observe that auxiliary receptacle 24 is preferably detachably secured to primary receptacle 12. The two receptacles work together but they could be manufactured separately and as such represent independent inventions as indicated by the claims that follow.

It will thus be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween. Now that the invention has been described,

What is claimed is:

1. A concrete wash-out bin, comprising:
   a primary receptacle having a rim positioned at an elevation that exceeds the elevation of a discharge port of an item of equipment adapted to handle concrete;
   said primary receptacle having an imperforate bottom wall, a transversely disposed front wall, a transversely disposed back wall, a first sidewall interconnecting a first end of said front wall to a first end of said back wall, and a second sidewall interconnecting a second end of said front wall to a second end of said back wall,
   an auxiliary receptacle positioned in leading relation to said primary receptacle, adjacent thereto and said auxiliary receptacle being hingedly connected to said primary receptacle;
   said auxiliary receptacle having an imperforate bottom wall, a transversely disposed front wall, a transversely disposed back wall, a first sidewall interconnecting a first end of said front wall to a first end of said back wall, and a second sidewall interconnecting a second end of said front wall to a second end of said back wall;

said auxiliary receptacle having a position of repose where it is substantially horizontally disposed at an elevation lower than said discharge port of said item of equipment;

said auxiliary receptacle having a discharge position where it is disposed in elevated and angled relation to said position of repose, said discharge position being effective to discharge the contents of said auxiliary receptacle into said primary receptacle;

lifting and lowering means for raising said auxiliary receptacle to said discharge position and for lowering said auxiliary receptacle to said position of repose, respectively;

a platform for supporting said primary receptacle and said auxiliary receptacle;

said platform being ground-supported and having a low profile so that said primary receptacle and said auxiliary receptacle are supported by said platform in closely spaced relation to said ground;

a first mounting lug secured to a top surface of said primary receptacle front wall, adjacent said first sidewall of said primary receptacle;

a second mounting lug secured to a top surface of said primary receptacle front wall, adjacent said second sidewall of said primary receptacle;

a first hinge plate having a trailing end rotatably mounted to said first mounting lug;

a second hinge plate having a trailing end rotatably mounted to said second mounting lug;

said first hinge plate having a leading end fixedly secured to said first sidewall of said auxiliary receptacle;

said second hinge plate having a leading end fixedly secured to said second sidewall of said auxiliary receptacle;

a first pivot pin extending from said first hinge plate in normal relation thereto;

a second pivot pin extending from said second hinge plate in normal relation thereto;

said lifting and lowering means including a first lifting and lowering means having a first end secured to said platform and a second end pivotally secured to said first pivot pin; and said lifting and lowering means including a second lifting and lowering means having a first end secured to said platform and a second end pivotally secured to said second pivot pin;

whereby wash water and concrete residue from a discharge port of a concrete-handling item of equipment is discharged into said auxiliary receptacle when said auxiliary receptacle is in said position of repose and said wash water and concrete residue is transferred to said primary receptacle by lifting said auxiliary receptacle from said position of repose to said elevated position; and whereby said auxiliary receptacle is lowered to said position of repose after being lifted to said discharge position so that additional wash water and concrete residue may be discharged into said auxiliary receptacle, said lifting and lowering being performed as many time as is needed until said wash water and concrete residue is removed from said item or equipment or until said primary receptacle is full, whichever first occurs.

2. The concrete wash-out bin of claim 1, further comprising:

said first and second sidewalls of said primary receptacle having a common height and said front wall having a height less than said common height.

3. The concrete wash-out bin of claim 1, further comprising:

said first lifting and lowering means including a first plunger telescopically engaged with a first cylinder;

said second lifting and lowering means including a second plunger telescopically engaged with a second cylinder;

whereby extension of said first plunger with respect to said first cylinder effects rotation of said first hinge plate in a first direction about said first mounting lug;

whereby extension of said second plunger with respect to said second cylinder effects rotation of said second hinge plate in a first direction about said second mounting lug;

whereby said rotation of said first and second hinge plates about said first and second mounting lugs in said first direction, respectively, effects rotation of said auxiliary receptacle in a first direction relative to said primary receptacle;

whereby retraction of said first plunger with respect to said first cylinder effects rotation of said first hinge plate in a second direction about said first mounting ear, said second direction being opposite to said first direction;

whereby retraction of said second plunger with respect to said second cylinder effects rotation of said second hinge plate in said second direction about said second mounting lug, said second direction being opposite to said first direction; and whereby said rotation of said first and second hinge plates about said first and second mounting lugs in said second direction, respectively, effects rotation of said auxiliary receptacle in a second direction relative to said primary receptacle.

4. The concrete wash-out bin of claim 3, further comprising:

said first lifting and lowering means being a first hydraulic cylinder; and said second lifting and lowering means being a second hydraulic cylinder.

5. The concrete wash-out bin of claim 1, further comprising:

said platform adapted to be engaged by a chain so that a concrete-handling item of equipment equipped with a winch may pull said platform and hence said primary receptacle and auxiliary receptacle towards said item of equipment so that said item of equipment need not be driven into close relationship with said platform.

6. The concrete wash-out bin of claim 1, further comprising:

a truncate platform for supporting said primary receptacle;

said truncate platform being ground-supported and having a low profile so that said primary receptacle is supported by said platform in closely spaced relation to said ground; and said auxiliary receptacle being supported by a ground surface in leading, adjacent relation to said platform.

7. The concrete wash-out bin of claim 6, further comprising:

said first and second sidewalls of said primary receptacle having a common height and said front wall having a height less than said common height.

8. The concrete wash-out bin of claim 7, further comprising:
- a first mounting lug secured to a top surface of said primary receptacle front wall, adjacent said first sidewall of said primary receptacle;
- a second mounting lug secured to a top surface of said primary receptacle front wall, adjacent said second sidewall of said primary receptacle;
- a first hinge plate having a trailing end rotatably mounted to said first mounting lug;
- a second hinge plate having a trailing end rotatably mounted to said second mounting lug;
- said first hinge plate having a leading end fixedly secured to said first sidewall of said auxiliary receptacle;
- said second hinge plate having a leading end fixedly secured to said second sidewall of said auxiliary receptacle;
- a first pivot pin extending from said first hinge plate in normal relation thereto;
- a second pivot pin extending from said second hinge plate in normal relation thereto;
- said lifting and lowering means including a first lifting and lowering means having a first end secured to said platform and a second end pivotally secured to said first pivot pin; and
- said lifting and lowering means including a second lifting and lowering means having a first end secured to said platform and a second end pivotally secured to said second pivot pin.

9. The concrete wash-out bin of claim 8, further comprising:
- said first lifting and lowering means including a first plunger telescopically engaged with a first cylinder;
- said second lifting and lowering means including a second plunger telescopically engaged with a second cylinder;
- whereby extension of said first plunger with respect to said first cylinder effects rotation of said first hinge plate in a first direction about said first mounting lug;
- whereby extension of said second plunger with respect to said second cylinder effects rotation of said second hinge plate in a first direction about said second mounting lug;
- whereby said rotation of said first and second hinge plates about said first and second mounting lugs in said first direction, respectively, effects rotation of said auxiliary receptacle in a first direction relative to said primary receptacle;
- whereby retraction of said first plunger with respect to said first cylinder effects rotation of said first hinge plate in a second direction about said first mounting ear, said second direction being opposite to said first direction;
- whereby retraction of said second plunger with respect to said second cylinder effects rotation of said second hinge plate in said second direction about said second mounting lug, said second direction being opposite to said first direction; and
- whereby said rotation of said first and second hinge plates about said first and second mounting lugs in said second direction, respectively, effects rotation of said auxiliary receptacle in a second direction relative to said primary receptacle.

10. The concrete wash-out bin of claim 9, further comprising:
- said first lifting and lowering means being a first hydraulic cylinder; and
- said second lifting and lowering means being a second hydraulic cylinder.

11. The concrete wash-out bin of claim 6, further comprising:
- said truncate platform adapted to be engaged by a chain so that a concrete-handling truck equipped with a winch may pull said truncate platform and hence said primary receptacle towards said truck so that said truck need not be driven into close relationship with said truncate platform.

* * * * *